US010506635B2

(12) United States Patent
Niu et al.

(10) Patent No.: US 10,506,635 B2
(45) Date of Patent: Dec. 10, 2019

(54) FRAME STRUCTURE FOR UPLINK SCHEDULING

(71) Applicant: Intel IP Corporation, Santa Clara, CA (US)

(72) Inventors: Huaning Niu, Milpitas, CA (US); Gang Xiong, Beavertown, OR (US); Yushu Zhang, Beijing (CN); Yuan Zhu, Beijing (CN); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/758,933

(22) PCT Filed: May 31, 2016

(86) PCT No.: PCT/US2016/035073
§ 371 (c)(1),
(2) Date: Mar. 9, 2018

(87) PCT Pub. No.: WO2017/065838
PCT Pub. Date: Apr. 20, 2017

(65) Prior Publication Data
US 2019/0045541 A1 Feb. 7, 2019

Related U.S. Application Data

(60) Provisional application No. 62/242,847, filed on Oct. 16, 2015.

(51) Int. Cl.
*H04W 74/08* (2009.01)
*H04W 74/00* (2009.01)
(Continued)

(52) U.S. Cl.
CPC ....... *H04W 74/0808* (2013.01); *H04L 5/0048* (2013.01); *H04L 5/0055* (2013.01);
(Continued)

(58) Field of Classification Search
CPC ............. H04W 74/0808; H04W 76/27; H04W 74/004; H04W 16/14; H04W 84/12; H04L 5/0048; H04L 5/0055
See application file for complete search history.

(56) References Cited

U.S. PATENT DOCUMENTS

| 8,222,966 B2 | 7/2012 | Ravi et al. | |
| 2012/0077510 A1* | 3/2012 | Chen | H04W 28/26 455/452.1 |

(Continued)

OTHER PUBLICATIONS

International Preliminary Report on Patentability dated Apr. 17, 2018 for International Application PCT/US2016/035073.
(Continued)

*Primary Examiner* — Duc C Ho
(74) *Attorney, Agent, or Firm* — Eschweiler & Potashnik, LLC

(57) ABSTRACT

An arrangement configured to be employed within a user equipment (UE). The arrangement includes control circuitry. The control circuitry is configured perform a clear channel assessment (CCA) during a data transmission with an evolved Node B (eNodeB), generate a clear channel indicator (CCI) based on the CCA, orthogonally multiplex an acknowledgement (ACK)/negative acknowledgement (NACK) with the CCI, where different sequences are allocated to the CCI and/or different resource block (RB) resources are allocated to the CCI, code and modulate a physical uplink control channel (PUCCH) using the multiplexed ACK/NACK, and provide the PUCCH having the CCI within the data transmission.

21 Claims, 6 Drawing Sheets

(51) Int. Cl.
  *H04W 76/27*  (2018.01)
  *H04L 5/00*  (2006.01)
  *H04W 84/12*  (2009.01)
  *H04L 1/18*  (2006.01)

(52) U.S. Cl.
  CPC ......... *H04W 74/004* (2013.01); *H04W 76/27*
    (2018.02); *H04L 1/18* (2013.01); *H04W 84/12*
    (2013.01)

(56) References Cited

U.S. PATENT DOCUMENTS

| | | | |
|---|---|---|---|
| 2014/0036853 | A1 | 2/2014 | Kim et al. |
| 2015/0085797 | A1 | 3/2015 | Ji et al. |
| 2015/0092702 | A1 | 4/2015 | Chen et al. |
| 2016/0095120 | A1* | 3/2016 | Gaal ................ H04L 5/0007 370/329 |
| 2016/0174109 | A1* | 6/2016 | Yerramalli, Sr. ..... H04W 28/26 370/329 |
| 2018/0198567 | A1* | 7/2018 | Huss ................ H04L 1/1829 |

OTHER PUBLICATIONS

"3rd Generation Partnership Project; Technical Specification Group Radio Access Network; Evolved Universal Terrestrial Radio Access (E-UTRA); LTE physical layer; General description (Release 13)", 3GPP TS 36.201 V13.1.0 (Mar. 2016), 3GPP Lte Advanced Pro. 14 pages.

"LTE; Evolved Universal Terrestrial Radio Access (E-UTRA); Physical channels and modulation (3GPP TS 36.211 version 13.1.0 Release 13)". ETSI TS 136 211 V13.1.0 (Apr. 2016). 3GPP Lte Advanced Pro. 157 pages.

LTE; Evolved Universal Terrestrial Radio Access (E-UTRA); Physical layer procedures (3GPP TS 36.213 version 13.0.0 Release 13). ETSI TS 136 213 V13.0.0 (May 2016). 3GPP Lte Advanced Pro. 328 pages.

"On the LLA UL: LBT, scheduling, and sub-frame structure." Source: Intel Corporation. Agenda Item: 6.2.4.3, 3GPP TSG RAN WG1 Meeting #81, Fukuoka, Japan, May 25-29, 2015, R1-152649, 4 pages.

"Solutions for required functionalities and design targts," Source: Qualcomm Incorporated, Agenda Item: 7.3.2.3, 3GPP TSG RAN WG1 #78bis, Oct. 6-10, 2014. Ljubljana, Slovenia. R1-144000. 5 pages.

"Solutions to DL LAA Hidden Node and Channel Reuse." Source: Institute for Information Industry (III). Agenda Item: 7.2.3.3. 3GPP TSG-RAN WG1 Meeting #80, Athens, Greece, Feb. 9-13, 2015. R1-150420. 6 pages.

International Search Report dated Aug. 30, 2016 for International Application PCT/US2016/0357073.

"LTE; Evolved Universal Terrestrial Radio Access (E-UTRA); Multiplexing and channel coding (3GPP TS 36.212 version 13.1.0 Release 13)," ETSI TS 136 212 V13.1.0 (Apr. 2016). 3GPP Lte Advanced Pro. 130 pages.

* cited by examiner

FRAME STRUCTURE FOR UPLINK SCHEDULING

REFERENCE TO RELATED APPLICATION

This application is a National Phase entry application of International Patent Application No. PCT/US2016/035073 filed May 31, 2016, which claims priority to U.S. Provisional Application 62/242,847 filed on Oct. 16, 2015, entitled "FRAME STRUCTURE FOR UNLICENSED BAND IN 5G NEW RAT" in the name of Huaning Niu et al. and is hereby incorporated by reference in its entirety.

FIELD

The present disclosure relates to mobile communication, including frame structures.

BACKGROUND

Mobile communications, including cellular communications, involve the transfer of data or information. Various bandwidths or bands of a spectrum are used for communication. These bands can be licensed or otherwise allocated for communication between mobile devices and base stations.

Typically, bands are allocated for use by only specific or authorized devices. This allocation, referred to as licensing, attempts to prevent issues such as cross talk, interference, noise and the like from degrading mobile communications. Only authorized devices can use the band, so the channels or bands are clear for communication.

However, portions of the spectrum or bands can remain unused for various reasons. It could be that a licensee isn't operating at the time. It could also be that the band is reserved for a purpose, but is not needed. This lack of use of spectrum, which is available, degrades mobile communications.

DETAILED DESCRIPTION

Figure 1:
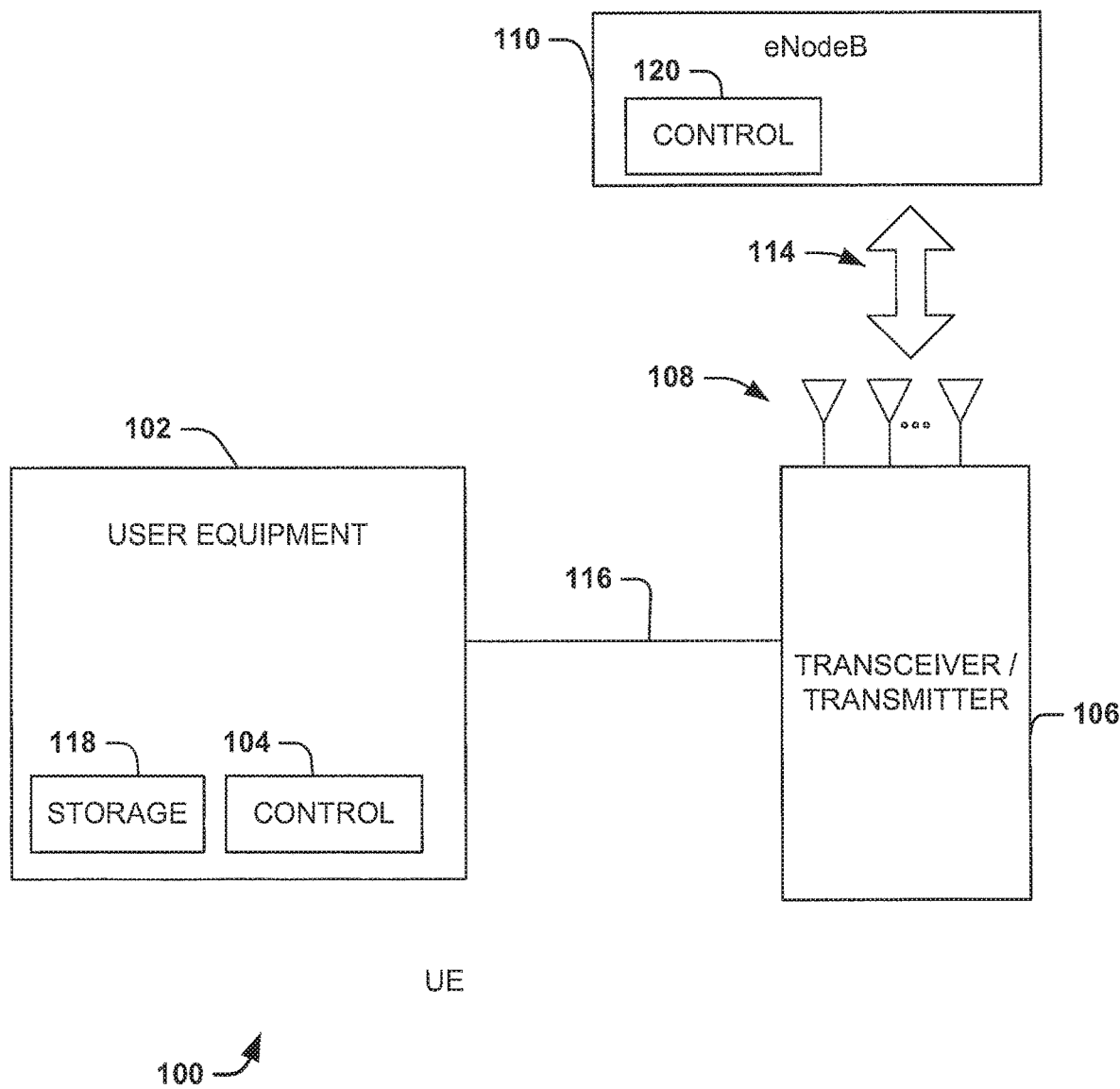
FIG. 1 is a diagram illustrating an arrangement for uplink communications using unlicensed bands.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

The radio frequency (RF) spectrum generally covers a frequency range from 3 kHz to 300 GHz. The RF spectrum can be used for mobile communications between mobile devices, including user equipment (UE) and base stations, including evolved Node B (eNodeB). Various portions of the RF spectrum is licensed for use via various mechanisms including auctions, lotteries and the like. Once licensed, that portion of the spectrum, also referred to as a band, is restricted for use by only the licensee.

Unlicensed portions of the RF spectrum also exist. These portions of the spectrum may be populated by various devices using varied communication techniques. For example, in one unlicensed portion of the spectrum a 5 GHz band is utilized by Wi-Fi and Wi-Fi devices. Wi-Fi devices, such as smartphones, laptops, tablets and the like utilize Wi-Fi for connecting to home networks, broadband services, hotspots and the like.

Mobile communications, including mobile communications using the Long Term Evolution (LTE) standard can utilize the unlicensed portions or bands, such as Wi-Fi. For example, LTE in the unlicensed spectrum (LTE-U) is a standard that uses the unlicensed 5 GHz band used by the Wi-Fi devices. Using the unlicensed portions can, for example, be used to improve data speeds over short distances without logging in or connecting to a separate network or Wi-Fi network.

It is noted that using the unlicensed bands requires that a check of the bands prior to use is made. The check can determine whether the band is currently in use or if it is available for use. If a particular band is being used, another band can be used.

Various embodiments are disclosed that facilitate the use of unlicensed bands for mobile communication. The embodiments include generating and providing an indicator that a channel is clear within an uplink portion of a control channel. The indicator, such as a clear channel indicator (CCI), identifies the available unlicensed band and available time for an uplink data communication.

FIG. 1 is a diagram illustrating an arrangement 100 for uplink communications using unlicensed bands. The arrangement 100 uses a subframe that permits both uplink and downlink portions for communications.

The arrangement 100 includes a user equipment (UE) 102, a transceiver 106 and an evolved Node B (eNodeB) 110. The UE 102 includes its transceiver 106, a storage component 118, and a controller 104. The storage component 118 includes a memory, storage element and the like and is configured to store information for the UE 102. The controller 104 is configured to perform various operations associated with the UE 102. The controller 104 can include logic, components, circuitry, one or more processors and the like. The transceiver 106 includes transmitter functionality and receiver functionality. The transceiver includes 106 one or more antenna 108 configured to send and receive signals from other devices. The UE 102 is configured to communicate with devices, such as the eNodeB 110.

The eNodeB 110 includes a transceiver, a storage component, and a controller 120. The storage component includes a memory, storage element and the like and is configured to store information for the UE 102. The controller 104 is configured to perform various operations associated with the eNodeB 110. The controller 120 can include logic, components, circuitry, one or more processors and the like. The transceiver includes transmitter functionality and receiver functionality. The transceiver typically includes one or more antenna configured to send and receive signals from other devices.

A data transmission 114 exists between the UE 102 and the eNodeB 110. The data transmission 114 includes a self contained subframe that can include both uplink and downlink portions. Thus, the subframe can include a transmission/uplink portion and/or a receive/downlink portion. The data transmission 114 uses an unlicensed band, such as a 5 GHz unlicensed band used for Wi-Fi.

The eNodeB 110 is configured to determine, identify, and or opportunistically select an unlicensed band for the data transmission 114. The eNodeB 110 may select or selects a channel/band within an unlicensed portion of the RF spectrum that is substantially free or only slightly loaded. In one example, the selected band is one that does not have a network actively operating on it, such as a Wi-Fi network. Additionally, the selected band is generally not in use for a radar system or some other similar purpose. Furthermore, the selected band may comply with power requirements, such as a transmit power limit.

The eNodeB 110 can use one or more suitable techniques for determining and/or selecting a band including, but not limited to listen before talk (LBT) and the like. If the selected band is occupied, the data transmission 114 can be delayed until it is free.

The controller 104 of the UE 102 is configured to determine and/or select a channel during the data transmission 114 for uplink data. The controller 104 determines availability for one or more channels within the selected band. The one or more channels can include a primary channel. The controller 104, for example, can measure power levels and the like of the one or more channels to determine availability. In another example, the controller 104 performs a clear channel assessment (CCA) for each of the one or more channels to determine availability. The determined availability also includes timing or scheduling of when the channel is available. Once the availability of each channel is determined, the controller 104 selects one of the one or more channels for the uplink data based on the determined availability. The availability can also include a schedule or timing for when the particular channel is available.

The CCA can measure and/or determine various power levels and compare the values to threshold values. In one example, if the measurements and/or levels are within or less than the threshold values, the CCA indicates that channel is acceptable for use.

The channel is selected/determined during a portion of the data transmission. In one example, the controller 104 selects the channel towards the end of the data transmission 114. In another example, the controller 104 identifies a gap in the data transmission 114 and selects/determines the channel during the identified gap.

The controller 104 is configured to generate a clear channel indicator (CCI) and a scheduling request (SR) for the selected channel based on the determined availability and the uplink data. The CCI identifies the selected channel and can provide a schedule for when the uplink data is provided. The schedule should provide sufficient time for the uplink data to be sent. The schedule also can include a delay to allow for a round trip time (RTT). In one example, the uplink schedule includes a delay of 2 times a RTT.

The CCI can indicate whether the determined CCA is within or passes via a threshold value. Additionally, the CCI can indicate that an entire bandwidth is clear, only selected channel and/or variations thereof. In one example, the CCI has one bit.

The controller 104 is also configured to send the CCI within an uplink control portion of the data transmission 114. The uplink control portion can include a physical uplink control channel (PUCCH). Alternately, the uplink control portion can be provided within an acknowledgement non-acknowledgement (ACK/NACK) portion of the data transmission.

In one example, the controller 104 can include baseband circuitry configured to generate the PUCCH with the CCI. The baseband circuitry can perform functions that include, but are not limited to, signal modulation/demodulation, encoding/decoding, radio frequency shifting, etc.

In another example, the controller 104 is configured to orthogonally multiplex an acknowledgement (ACK)/negative acknowledgement (NACK) with the CCI and the SR.

Different sequences are allocated to the CCI and/or different resource block (RB) resources are allocated to the CCI. The controller 104 is also configured to code and modulate a PUCCH using the multiplexed ACK/ACK and provide the PUCCH having the CCI with the data transmission. In one example, the control circuitry is configured to code and modulate the PUCCH using PUCCH format 1 for ACK/NACK transmissions.

The transceiver 106 is configured to send or transmit the PUCCH having the CCI via the data transmission 114.

Additionally, it is appreciated that the arrangement 100 can include one or more additional UE devices configured similarly to the UE 102 and additional base stations or eNodeBs.

Figure 2:
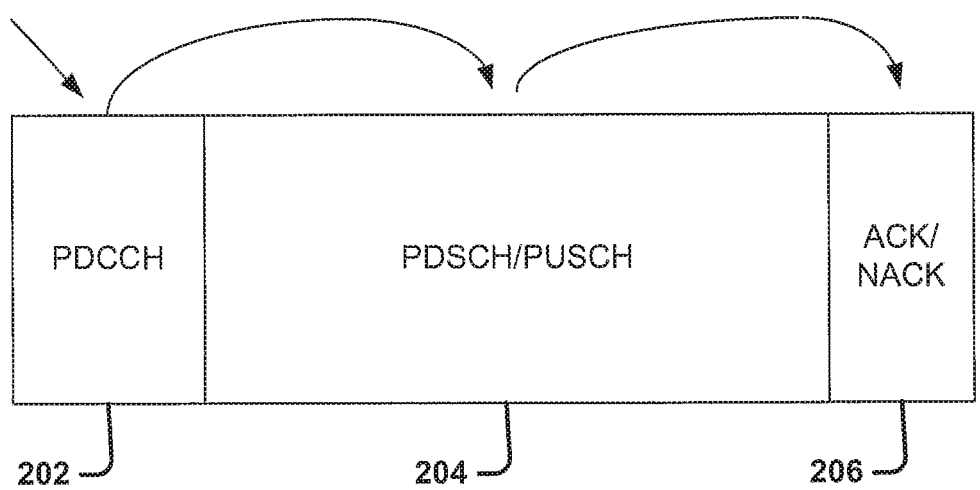
FIG. 2 is a diagram illustrating an example self contained subframe.

FIG. 2 is a diagram illustrating an example self contained subframe 200. The subframe 200 is provided for illustrative purposes and it is appreciated that variations in the subframe 200 and portions thereof are contemplated. The subframe 200 can be used with the data transmission 114 of the arrangement 100, described above.

The subframe 200 includes a portion that can be configured for uplink communications, from a user equipment (UE) to an evolved Node B or downlink communications, data from an evolved Node B to a UE.

The subframe 200 includes a downlink control channel 202, an uplink/downlink data portion 204 and an ACK/NACK portion 206. The downlink control channel 202 includes control channel information provided by an eNodeB. In one example, the downlink control channel 202 is a physical downlink control channel (PDCCH).

The data portion 204 can be configured for uplink and/or downlink operation. In one example, the data portion is configured for uplink of data and is a physical uplink shared channel (PUSCH). In another example, the data portion is configured for downlink of data and is a physical downlink shared channel (PDSCH). The downlink control channel 202 dynamically configures the data portion 204 to be uplink and/or downlink.

The ACK/NACK portion 206 permits acknowledgements (ACKs) and non acknowledgements (NACKs) to be provided in response to the data portion 204. The ACK/NACK portion 206 can be configured to include clear channel indicator (CCI) for uplink data from the UE to the eNodeB. The CCI identifies a selected channel and a schedule for when uplink data will be provided. The ACK/NACK portion 206 can also be configured to include a scheduling request (SR) for the CCI.

Figure 3:
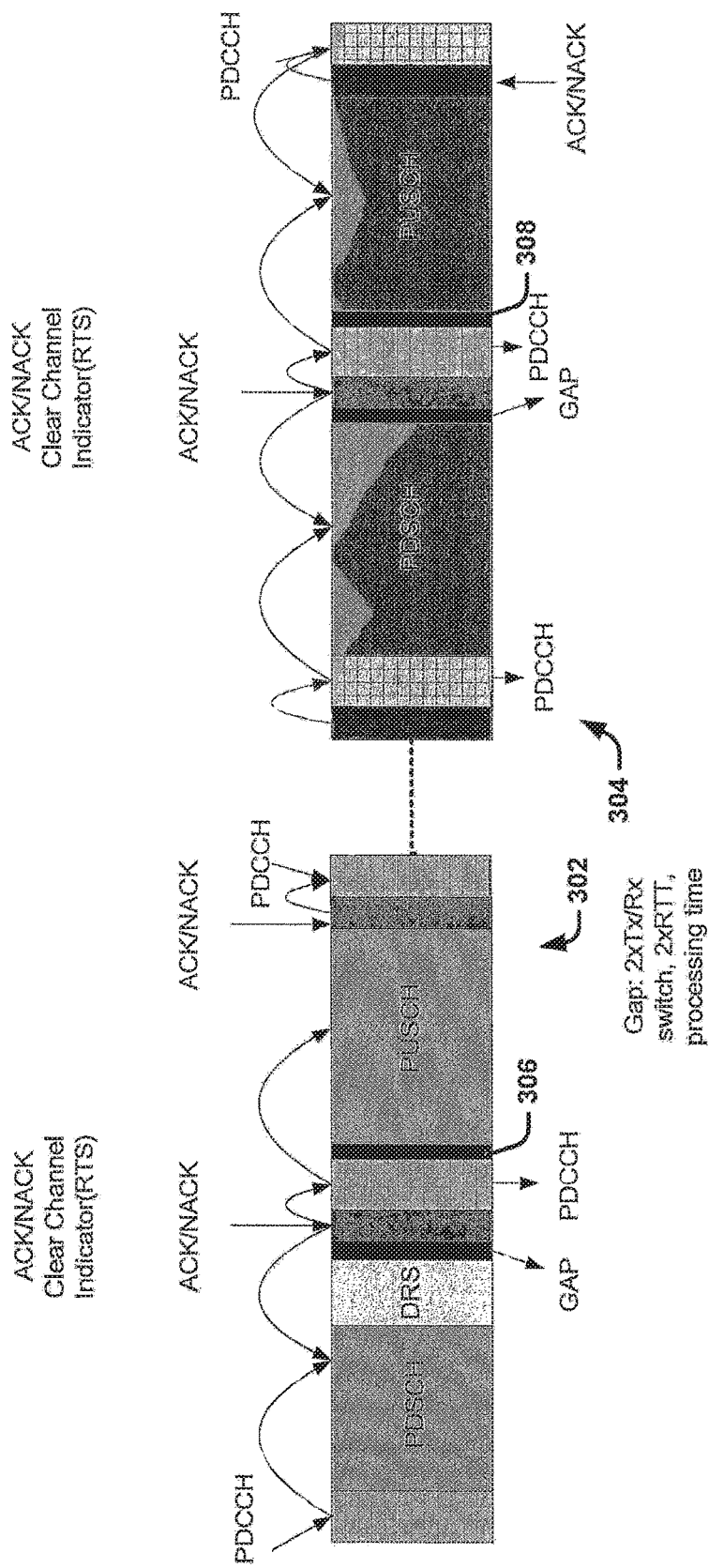
FIG. 3 is a diagram illustrating an example frame structure utilizing subframes having both uplink and downlink portions.

FIG. 3 is a diagram illustrating an example frame structure 300 utilizing subframes having both uplink and downlink portions. The frame or frame structure 300 is provided for illustrative purposes and it is appreciated that variations in the frame 300 and portions thereof are contemplated. The frame 300 can be used with the data transmission 114 of the arrangement 100, described above. Additionally, the frame 300 can be used for unlicensed bands.

For this example, an evolved Node B (eNodeB) performs carrier sensing for an unlicensed band prior to a first transmission 302, also referred to as a first transmission burst. The carrier sensing can include a request to send (RTS) followed by a response from another device that it is clear to send (CTS). Additionally, the eNodeB can perform backoff counting to comply with one or more standards, such as Wi-Fi. In one example, the eNodeB performs a clear channel assessment (CCA) and backoff mechanism to permit Wi-Fi communications. In another example, the eNodeB uses a CCA and backoff mechanism in compliance with the License Assisted Access (LAA).

Once the unlicensed band is identified, the eNodeB holds the band for a period of time or duration. The held time can be a transmission opportunity (TxOP) as used in WiFi, max continuous occupancy time (MOOT) as used with LAA, and the like. The held time, in one example, is about 5-10 ms.

The first transmission 302 begins with a PDCCH that includes whether a succeeding data portion is uplink or downlink. In this example, the adjacent portion is for downlink, PDSCH. A dedicated reference signal (DRS) is then provided and can be retransmitted periodically. A gap or gap portion follows having a relatively short duration and is based on a transmission and receiving processing time. In one example, the gap has a duration of twice a transmission and twice a receiving processing time. In another example, the gap has a duration based on twice a round trip time (RTT) processing time.

The UE can perform a clear channel assessment (CCA) during the gap portion and/or the DRS portion. In one example, the gap is not long enough and the UE is configured to perform a CCA during the last symbol of a data transmission. The CCA can include a request to send (RTS) and a received response clear to send (CTS) for a selected channel and duration of use. The CCA can include the UE configured to measure a total received power and subtract a receiver power of the eNodeB that provided the PDSCH. In one example, the receiver power can be calculated from a Demodulated Reference Signal (DM-RS) and/or a channel status indicator (CSI) reference signal. The UE can measure the total received power using the DRS.

In another example, the CCA is determined or performed using Received Signal Strength Indicator (RSSI) based on a serving cell specific reference signals (CRS). The CCA is performed to select/identify a channel of an unlicensed band for uplink of data from the UE and to determine/select a schedule for the uplink of data. The UE generates a first clear channel indicator (CCI) for the uplink of data based on the CCA.

The various measurements and/or power can be compared with threshold value(s) and/or acceptable value(s) to determine whether the channel is clear.

An ACK/NACK portion follows the game and includes uplink control channel, such as PUCCH, information, including CCI. The ACK/NACK portion is configured to include and send the first CCI for uplink data from the UE to the eNodeB. The first CCI identifies a selected channel and a schedule for when uplink data will be provided.

A second PDCCH follows the ACK/NACK portion that includes additional control information for a succeeding data portion. A gap 306 comes after the PDCCH and is based on the schedule or timing provided in the CCI. The first CCI is shown as sent with the ACK/NACK portion, however it is appreciated that the first CCI can be sent at other times and can be repeated during other ACK/NACK portions.

A physical uplink shared channel (PUSCH) starts according to the CCI information and according to the second PDCCH. The PUSCH includes data and uses the selected channel and the identified schedule.

A second transmission 304 includes a first a PDCCH that includes whether a succeeding data portion is uplink or downlink. The second transmission 304 follows the first transmission 302. There can be a break of time there between transmissions or the second transmission 304 can immediately follow the first transmission. In this example for the second transmission, the adjacent portion is for downlink, PDSCH. A gap or gap portion follows having a relatively short duration and is based on a transmission and receiving processing time. This gap permits time for the UE to receive and process data from the PDSCH, generate an ACK/NACK response and generate a second CCI.

The UE performs a second clear channel assessment (CCA) during the gap portion. The CCA is performed to select/identify a channel of an unlicensed band for uplink of data from the UE and to determine/select a schedule for the uplink of data. The UE generates a second clear channel indicator (CCI) for the uplink of data based on the CCA.

An ACK/NACK portion includes the ACK/NACK response and uplink control information, including the second CCI for uplink data from the UE to the eNodeB. The second CCI identifies a selected channel and a schedule for when uplink data will be provided.

A second PDCCH for the second transmission 304 follows the ACK/NACK portion that includes additional control information for a succeeding data portion. The second PDCCH control information indicates data is to be uplinked from the UE to the eNodeB. A gap 308 comes after the PDCCH and is based on the schedule or timing provided in the second CCI.

A PUSCH for the second transmission 304 starts according to the second CCI information and according to the second PDCCH. The PUSCH includes data and uses the selected channel and the identified schedule.

Figure 4:
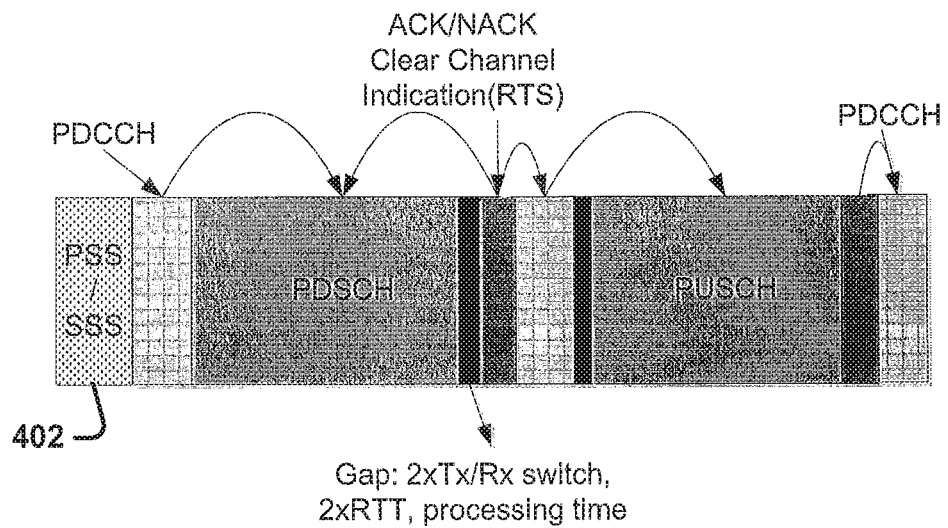
FIG. 4 is a diagram illustrating an example frame structure utilizing subframes having both uplink and downlink portions.

FIG. 4 is a diagram illustrating an example frame structure 400 utilizing subframes having both uplink and downlink portions. The frame or frame structure 400 is provided for illustrative purposes and it is appreciated that variations in the frame 400 and portions thereof are contemplated. The frame 400 can be used with the data transmission 114 of the arrangement 100, described above. Additionally, the frame 400 can be used for unlicensed bands.

An evolved node B (eNodeB) performs carrier sensing or uses another suitable technique to identify a channel or unlicensed band that is suitable for use.

The frame 400 operates similar to the frame 300, however the frame 400 begins with a DRS 402, which is generated to hold the medium. The DRS in this example includes a primary synchronization signal (PSS) and/or a secondary synchronization signal (SSS), the facilitates aligning a TTI boundary. Multiple copies of a PSS are transmitted and followed by a single SSS. The DRS are also used to hold the medium and prevent another mobile device from sensing a channel as clear.

In one example, an eNodeB finishes a clear channel assessment (CCA) to select an unlicensed channel or band and generates a backoff counter. If there are 3 symbol durations left after generating the backoff counter and finishing the CCA, the eNodeB can send 2 PSS symbols and a single SSS symbol to hold the medium. The UE can perform synchronization and automatic gain control (AGC) setting using the DRS symbols, the 2 PSS symbols and the SSS symbol.

In another example, the eNodeB has only a single symbol duration after processing, including generating the backoff counter and finishing the CCA. For the single symbol, a single PSS symbol can be used to hold the medium.

A PDCCH, PDSCH and a gap follow. The UE performs a clear channel assessment (CCA) during at least the gap portion. The CCA can include the UE configured to measure a total received power and subtract a receiver power of the eNodeB that provided the PDSCH. The CCA is performed to select/identify a channel of an unlicensed band for uplink of data from the UE and to determine/select a schedule for the uplink of data. The UE generates a clear channel indicator (CCI) for the uplink of data based on the CCA.

The CCI is provided with an ACK/NACK portion 404. The ACK/NACK portion includes the ACK/NACK response and uplink control information, including the CCI for uplink data from the UE to the eNodeB. The CCI identifies a selected channel and a schedule for when uplink data will be provided.

Figure 5:
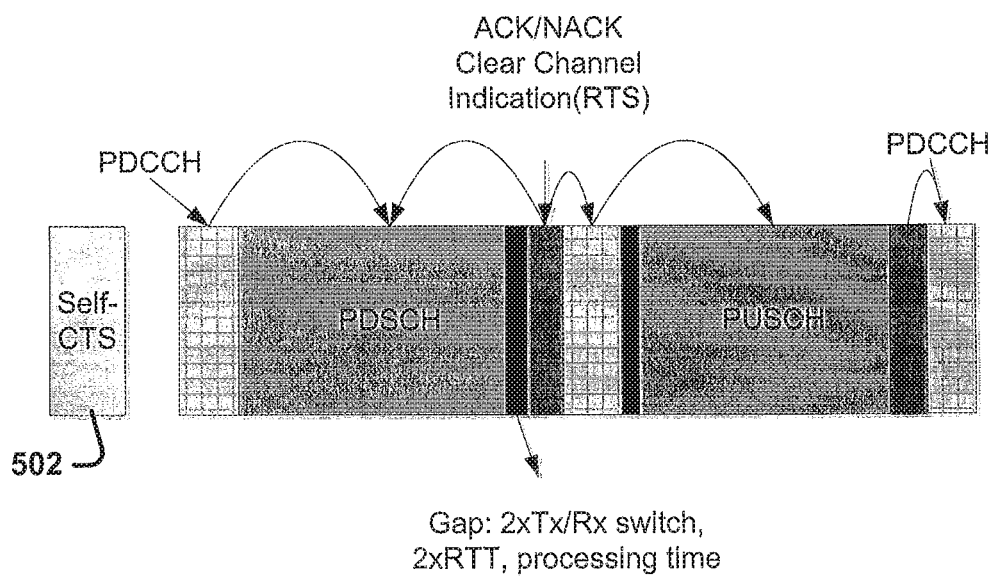
FIG. 5 is a diagram illustrating an example frame structure utilizing subframes having both uplink and downlink portions.

FIG. 5 is a diagram illustrating an example frame structure 500 utilizing uplink and downlink portions. The frame or frame structure 500 is provided for illustrative purposes and it is appreciated that variations in the frame 500 and portions thereof are contemplated. The frame 500 can be used with the data transmission 115 of the arrangement 100, described above. Additionally, the frame 500 can be used for unlicensed bands.

An evolved node B (eNodeB) performs carrier sensing or uses another suitable technique to identify a channel or unlicensed band that is suitable for use.

The frame 500 operates similar to the frame 300, however the frame 500 a Wi-Fi self-Clear to Send (CTS) packet 502 to hold the medium.

The Wi-Fi self-CTS packet 502 is utilized to identify an unused or clear unlicensed band typically used for Wi-Fi. The packet 502 can be received by other devices, including Wi-Fi devices, mobile devices and the like. The packet 502 specifies an unlicensed band/channel, a duration/schedule for use of the specified channel and an identifier associated with the eNodeB. The packet 502 serves to reserve the specified channel for the provided schedule.

The subsequent portion of the transmission or frame 500 is similar to the frame 400. A PDCCH, PDSCH and a gap follow. The UE performs a clear channel assessment (CCA) during at least the gap portion. The CCA can include the UE configured to measure a total received power and subtract a receiver power of the eNodeB that provided the PDSCH. The CCA is performed to select/identify a channel of an unlicensed band for uplink of data from the UE and to determine/select a schedule for the uplink of data. The UE generates a clear channel indicator (CCI) for the uplink of data based on the CCA.

The CCI is provided with an ACK/NACK portion 504. The ACK/NACK portion includes the ACK/NACK response and uplink control information, including the CCI for uplink data from the UE to the eNodeB. The CCI identifies a selected channel and a schedule for when uplink data will be provided.

It is appreciated that the frame 500 is provided as an example and that suitable variations are contemplated.

Figure 6:
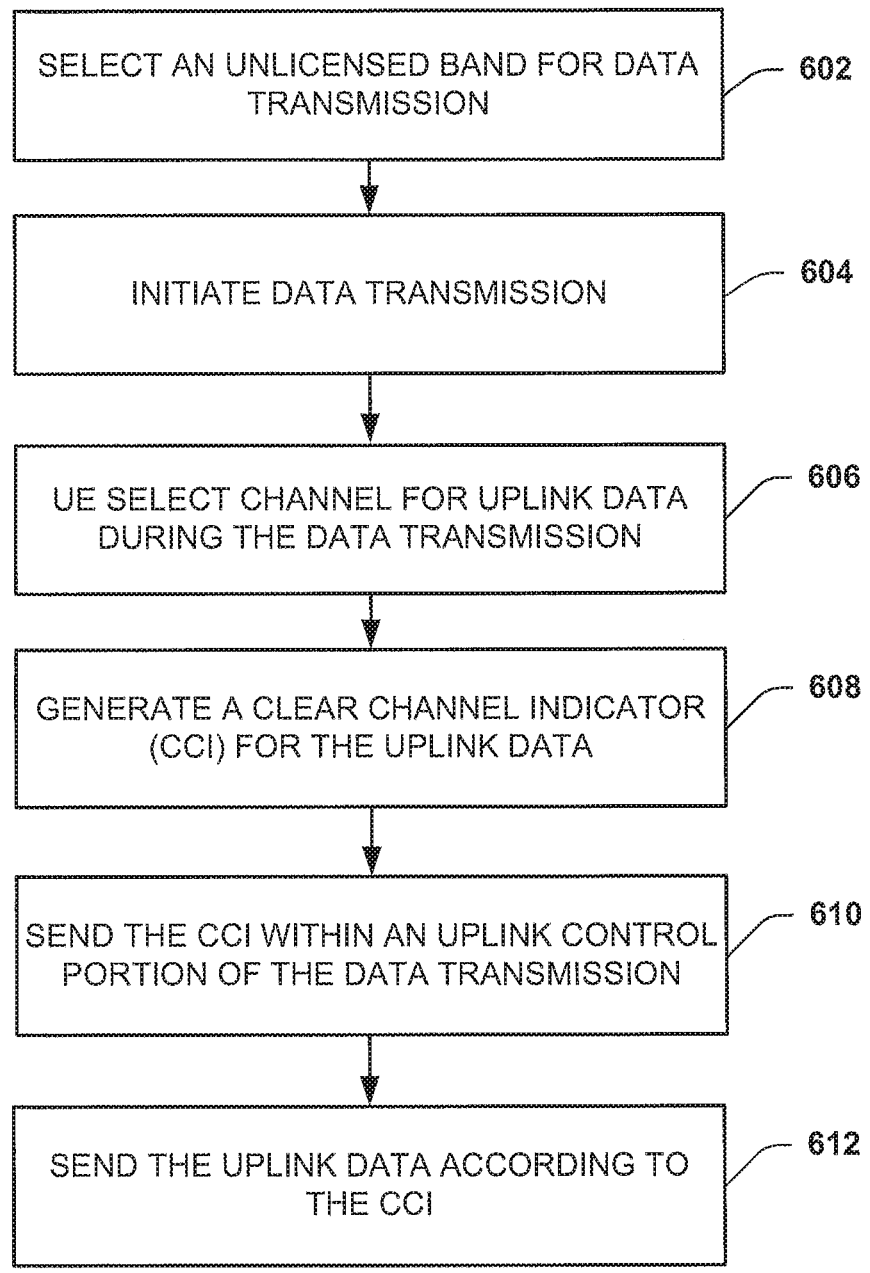
FIG. 6 is a flow diagram illustrating a method of performing uplink communications using unlicensed bands.

FIG. 6 is a flow diagram illustrating a method 600 of performing uplink communications using unlicensed bands. The method 600 utilizes self contained subframes that can be configured for uplink and/or downlink communications.

An evolved Node B (eNodeB) is configured to select an unlicensed band for data transmission at block 602. The eNodeB selects that unlicensed band using a suitable technique, such as performing a clear channel assessment (CCA), initiating a request to send (RTS) and a clear to send (CTS) process, sending a Wi-Fi self CTS packet, listen before talk (LBT) and the like.

The eNodeB initiates a data transmission on the selected band at block 604. The data transmission uses one or more self contained subframes that are configurable for uplink and/or downlink data. The data transmission can include physical downlink control channels (PDCCH), physical downlink shared channels (PDSCH) and the like.

A user equipment (UE) selects a channel for uplink data during at least a portion of the data transmission at block 606. The UE selects the channel using a suitable technique including a clear channel assessment (CCA) and the like. The selected channel includes a time or duration needed to hold or use the selected channel. The duration can be based on an amount of data to be sent from the UE.

The UE generates a clear channel indicator (CCI) according to the selected channel for the uplink data at block 608. The CCI includes, for example, an identification of the UE, the selected channel, a schedule for use of the selected channel and the like. The schedule includes a start time for the uplink data and can include processing times, round trip times (RTT) between the UE and the eNodeB, and the like.

The UE sends the CCI within an uplink control portion of the data transmission to the eNodeB at block 610. The uplink control portion includes a physical uplink control channel (PUCCH), an ACK/NACK portion and the like of a subframe.

In one example, the ACK/NACK portion is multiplexed with the CCI and the SR. The multiplexed ACK/NACK is used to code and modulate the PUCCH.

The UE generates and sends or transmits the uplink data according to the CCI at block 612. The uplink data can be configured as part of a physical uplink shared channel (PUSCH). The uplink data is provided at the scheduled start time.

It is appreciated that the method 600 can be repeated for additional data transmissions and/or additional uplink data.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
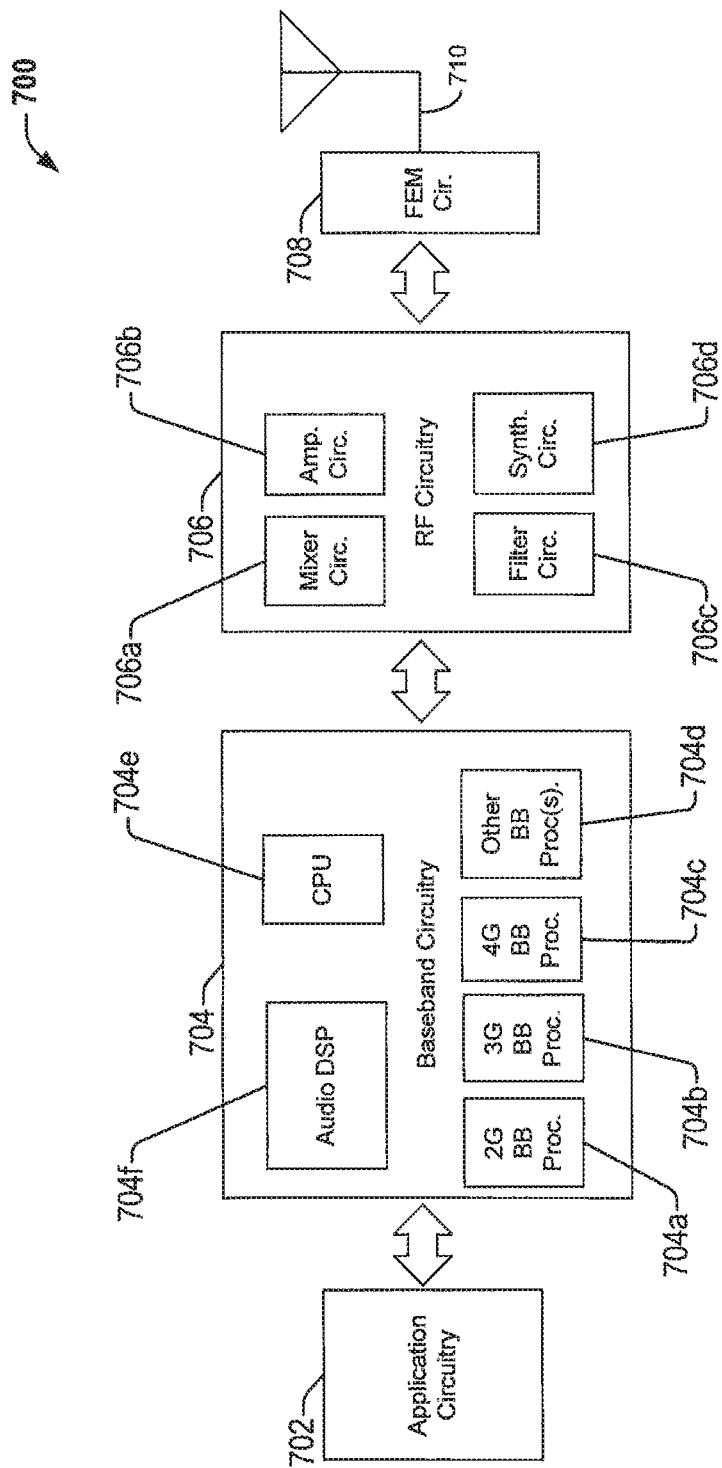
FIG. 7 illustrates example components of a User Equipment (UE) device.

Embodiments described herein can be implemented into a system using any suitably configured hardware and/or software. FIG. 7 illustrates, for one embodiment, example components of a User Equipment (UE) device 700. In some embodiments, the UE device 700 (e.g., the wireless communication device) can include application circuitry 702, baseband circuitry 704, Radio Frequency (RF) circuitry 706, front-end module (FEM) circuitry 708 and one or more antennas 710, coupled together at least as shown.

The application circuitry 702 can include one or more application processors. For example, the application circuitry 702 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 704 can include circuitry such as, but not limited to, one or more single-core or multi-core processors. The baseband circuitry 704 can include one or more baseband processors and/or control logic to process baseband signals received from a receive signal path of the RF circuitry 706 and to generate baseband signals for a transmit signal path of the RF circuitry 706. Baseband processing circuitry 704 can interface with the application circuitry 702 for generation and processing of the baseband signals and for controlling operations of the RF circuitry 706. For example, in some embodiments, the baseband circuitry 704 can include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) can handle various radio control functions that enable communication with one or more radio networks via the RF circuitry 706. The radio control functions can include, but are not limited to, signal modulation/demodulation, encoding/decoding, radio frequency shifting, etc. In some embodiments, modulation/demodulation circuitry of the baseband circuitry 704 can include Fast-Fourier Transform (FFT), precoding, and/or constellation mapping/demapping functionality. In some embodiments, encoding/decoding circuitry of the baseband circuitry 704 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 704 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 can be configured to run elements of the protocol stack for signaling of the PHY, MAC, RLC, PDCP and/or RRC layers. In some embodiments, the baseband circuitry can include one or more audio digital signal processor(s) (DSP) 704f. The audio DSP(s) 704f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 704 and the application circuitry 702 can be implemented together such as, for example, on a system on a chip (SOC).

In some embodiments, the baseband circuitry 704 can provide for communication compatible with one or more radio technologies. For example, in some embodiments, the baseband circuitry 704 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol can be referred to as multi-mode baseband circuitry.

RF circuitry 706 can enable communication with wireless networks using modulated electromagnetic radiation through a non-solid medium. In various embodiments, the RF circuitry 706 can include switches, filters, amplifiers, etc. to facilitate the communication with the wireless network. RF circuitry 706 can include a receive signal path which can include circuitry to down-convert RF signals received from the FEM circuitry 708 and provide baseband signals to the baseband circuitry 704. RF circuitry 706 can also include a transmit signal path which can include circuitry to up-convert baseband signals provided by the baseband circuitry 704 and provide RF output signals to the FEM circuitry 708 for transmission.

In some embodiments, the RF circuitry 706 can include a receive signal path and a transmit signal path. The receive signal path of the RF circuitry 706 can include mixer circuitry 706a, amplifier circuitry 706b and filter circuitry 706c. The transmit signal path of the RF circuitry 706 can include filter circuitry 706c and mixer circuitry 706a. RF circuitry 706 can also include synthesizer circuitry 706d for synthesizing a frequency for use by the mixer circuitry 706a of the receive signal path and the transmit signal path. In some embodiments, the mixer circuitry 706a of the receive signal path can be configured to down-convert RF signals received from the FEM circuitry 708 based on the synthesized frequency provided by synthesizer circuitry 706d. The amplifier circuitry 706b can be configured to amplify the down-converted signals and the filter circuitry 706c can be a low-pass filter (LPF) or band-pass filter (BPF) configured to remove unwanted signals from the down-converted signals to generate output baseband signals. Output baseband signals can be provided to the baseband circuitry 704 for further processing. In some embodiments, the output baseband signals can be zero-frequency baseband signals, although this is not a requirement. In some embodiments, mixer circuitry 706a of the receive signal path can comprise passive mixers, although the scope of the embodiments is not limited in this respect.

In some embodiments, the mixer circuitry 706a of the transmit signal path can be configured to up-convert input baseband signals based on the synthesized frequency provided by the synthesizer circuitry 706d to generate RF output signals for the FEM circuitry 708. The baseband signals can be provided by the baseband circuitry 704 and can be filtered by filter circuitry 706c. The filter circuitry 706c can include a low-pass filter (LPF), although the scope of the embodiments is not limited in this respect.

In some embodiments, the mixer circuitry 706a of the receive signal path and the mixer circuitry 706a of the transmit signal path can include two or more mixers and can be arranged for quadrature downconversion and/or upconversion respectively. In some embodiments, the mixer circuitry 706a of the receive signal path and the mixer circuitry 706a of the transmit signal path can include two or more mixers and can be arranged for image rejection (e.g., Hartley image rejection). In some embodiments, the mixer circuitry 706a of the receive signal path and the mixer circuitry 706a can be arranged for direct downconversion and/or direct upconversion, respectively. In some embodiments, the mixer circuitry 706a of the receive signal path and the mixer circuitry 706a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 706 can include analog-to-digital converter (ADC) and digital-to-analog converter (DAC) circuitry and the baseband circuitry 704 can include a digital baseband interface to communicate with the RF circuitry 706.

In some dual-mode embodiments, a separate radio IC circuitry can be provided for processing signals for each spectrum, although the scope of the embodiments is not limited in this respect.

In some embodiments, the synthesizer circuitry 706d can be a fractional-N synthesizer or a fractional N/N+8 synthesizer, although the scope of the embodiments is not limited in this respect as other types of frequency synthesizers can be suitable. For example, synthesizer circuitry 706d can be a delta-sigma synthesizer, a frequency multiplier, or a synthesizer comprising a phase-locked loop with a frequency divider.

The synthesizer circuitry 706d can be configured to synthesize an output frequency for use by the mixer circuitry 706a of the RF circuitry 706 based on a frequency input and a divider control input. In some embodiments, the synthesizer circuitry 706d can be a fractional N/N+8 synthesizer.

In some embodiments, frequency input can be provided by a voltage controlled oscillator (VCO), although that is not a requirement. Divider control input can be provided by either the baseband circuitry 704 or the applications processor 702 depending on the desired output frequency. In some embodiments, a divider control input (e.g., N) can be determined from a look-up table based on a channel indicated by the applications processor 702.

Synthesizer circuitry 706d of the RF circuitry 706 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 706 can include an IQ/polar converter.

FEM circuitry 708 can include a receive signal path which can include circuitry configured to operate on RF signals received from one or more antennas 780, amplify the received signals and provide the amplified versions of the received signals to the RF circuitry 706 for further processing. FEM circuitry 708 can also include a transmit signal path which can include circuitry configured to amplify signals for transmission provided by the RF circuitry 706 for transmission by one or more of the one or more antennas 780.

In some embodiments, the FEM circuitry 708 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 706). The transmit signal path of the FEM circuitry 708 can include a power amplifier (PA) to amplify input RF signals (e.g., provided by RF circuitry 706), and one or more filters to generate RF signals for subsequent transmission (e.g., by one or more of the one or more antennas 780.

In some embodiments, the UE device 700 can include additional elements such as, for example, memory/storage, display, camera, sensor, and/or input/output (I/O) interface.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an arrangement configured to be employed within a user equipment (UE). The arrangement includes control circuitry. The control circuitry is configured perform a clear channel assessment (CCA) during a data transmission with an evolved Node B (eNodeB), generate a clear channel indicator (CCI) based on the CCA, orthogonally multiplex an acknowledgement (ACK)/negative acknowledgement (NACK) with the CCI, where different sequences are allocated to the CCI and/or different resource block (RB) resources are allocated to the CCI, code and modulate a physical uplink control channel (PUCCH) using the multiplexed ACK/NACK, and provide the PUCCH having the CCI within the data transmission.

Example 2 includes the subject matter of Example 1, including or omitting optional elements, where the control circuitry is configured to perform the CCA towards an end of the data transmission.

Example 3 includes the subject matter of any of Examples 1-2, including or omitting optional elements, where the control circuitry is configured to perform the CCA during a gap in the data transmission.

Example 4 includes the subject matter of any of Examples 1-3, including or omitting optional elements, where the CCI indicates that an entire bandwidth is clear and that the CCA has passed a threshold value.

Example 5 includes the subject matter of any of Examples 1-4, including or omitting optional elements, where the CCI indicates that each channel of a bandwidth is clear.

Example 6 includes the subject matter of any of Examples 1-5, including or omitting optional elements, where the control circuitry CCI only indicates that a primary channel of a bandwidth is clear.

Example 7 includes the subject matter of any of Examples 1-6, including or omitting optional elements, where the control circuitry is configured to sense component carriers configured by one or more higher layers.

Example 8 includes the subject matter of any of Examples 1-7, including or omitting optional elements, where the component carriers are configured using RRC signaling.

Example 9 includes the subject matter of any of Examples 1-8, including or omitting optional elements, where the control circuitry is configured to orthogonally multiplex the ACK/NACK with the CCI and a scheduling request (SR).

Example 10 includes the subject matter of any of Examples 1-9, including or omitting optional elements, further including a transceiver configured to transmit the PUCCH having the CCI.

Example 11 includes the subject matter of any of Examples 1-10, including or omitting optional elements, where the data transmission is on an unlicensed band.

Example 12 includes the subject matter of any of Examples 1-11, including or omitting optional elements, where the data transmission is on a Wi-Fi band.

Example 13 is an arrangement configured to be employed within an evolved Node B (eNodeB). The arrangement includes control circuitry. The control circuitry is configured to perform a clear channel assessment (CCA) to select an unlicensed band for a data transmission with a user equipment (UE), initiate the data transmission with the UE, and receive a physical uplink control channel (PUCCH) from the UE. The PUCCH includes a clear channel indicator (CCI) and a scheduling request (SR) and the PUCCH identifies a selected channel for uplink data.

Example 14 includes the subject matter of Example 13, including or omitting optional elements, where the control circuitry is configured to receive a physical uplink shared channel (PUSCH) according to the CCI and the SR.

Example 15 includes the subject matter of any of Examples 13-14, including or omitting optional elements, where the control circuitry is configured to hold the unlicensed band for a duration using one or more digital reference signals (DRS).

Example 16 includes the subject matter of any of Examples 13-15, including or omitting optional elements, where the control circuitry is configured to hold the unlicensed band for a duration by using a Wi-Fi self-CTS packet.

Example 17 includes the subject matter of any of Examples 13-16, including or omitting optional elements, where the UE is configured to select a channel for the uplink data and generate the CCI according to the selected channel.

Example 18 includes one or more computer-readable media having instructions. The instructions, when executed, cause one or more user equipment (UE) to select a channel for uplink data during at least a portion of a data transmission, generate a clear channel indicator (CCI) according to the selected channel for the uplink data, multiplex an acknowledgement (ACK)/negative acknowledgement (NACK) with the CCI and a scheduling request (SR), code and modulate a physical uplink control channel (PUCCH) using the multiplexed ACK/NACK and transmit the PUCCH having the CCI with the data transmission.

Example 19 includes the subject matter of Example 18, including or omitting optional elements, where the instructions, when executed, further cause the one or more user equipment (UEs) to transmit the uplink data according to the CCI and the SR.

Example 20 includes the subject matter of any of Examples 18-19, including or omitting optional elements, where the PUCCH is coded and modulated using the PUCCH format 1 for ACK/NACK transmissions.

Example 21 includes the subject matter of any of Examples 18-20, including or omitting optional elements, where the CCI and the SR indicate a start time for the uplink data.

Example 22 is an arrangement configured to be employed within a user equipment (UE). The arrangement includes a means for selecting a channel for uplink data during at least a portion of a data transmission, a means for performing a clear channel assessment (CCA) for the selected channel, a means for generating a clear channel indicator (CCI) according to the CCA and the selected channel for the uplink data, and a means for coding the CCI within a physical uplink control channel (PUCCH) of the data transmission.

Example 23 is an arrangement configured to be employed within a user equipment (UE). The arrangement includes control circuitry. The control circuitry is configured to select a channel for uplink data during at least a portion of a data transmission, generate a clear channel indicator (CCI) according to the selected channel for the uplink data, and send the CCI within an uplink control portion or PUCCH of the data transmission.

Example 24 includes the subject matter of Examples 23, including or omitting optional elements, where the control circuitry is configured to send the uplink data according to the CCI.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An arrangement configured to be employed within a user equipment (UE), the arrangement comprising:
   control circuitry configured to
      perform a clear channel assessment (CCA) during a data transmission with an evolved Node B (eNodeB);
      generate a clear channel indicator (CCI) based on the CCA;
      orthogonally multiplex an acknowledgement (ACK)/negative acknowledgement (NACK) with the CCI, where different sequences are allocated to the CCI and/or different resource block (RB) resources are allocated to the CCI;
      code and modulate a physical uplink control channel (PUCCH) using the multiplexed ACK/NACK; and
      provide the PUCCH having the CCI within the data transmission.

2. The arrangement of claim 1, wherein the control circuitry is configured to perform the CCA towards an end of the data transmission.

3. The arrangement of claim 1, wherein the control circuitry is configured to perform the CCA during a gap in the data transmission.

4. The arrangement of claim 1, wherein the CCI indicates that an entire bandwidth is clear and the CCA has passed a threshold value.

5. The arrangement of claim 1, wherein the CCI indicates that each channel of a bandwidth is clear.

6. The arrangement of claim 1, wherein the CCI only indicates that a primary channel of a bandwidth is clear.

7. The arrangement of claim 1, wherein the control circuitry is configured to sense component carriers configured by one or more higher layers.

8. The arrangement of claim 7, wherein the component carriers are configured using radio resource control (RRC) signaling.

9. The arrangement of claim 1, wherein the control circuitry is configured to orthogonally multiplex the ACK/NACK with the CCI and a scheduling request (SR).

10. The arrangement of claim 1, further comprising a transceiver configured to transmit the PUCCH having the CCI.

11. The arrangement of claim 1, wherein the data transmission is on an unlicensed band.

12. The arrangement of claim 1, wherein the data transmission is on a Wi-Fi band.

13. An arrangement configured to be employed within an evolved Node B (eNodeB), the arrangement comprising:
   control circuitry configured to
      perform a clear channel assessment (CCA) to select an unlicensed band for a data transmission with a user equipment (UE);
      initiate the data transmission with the UE; and
      receive a physical uplink control channel (PUCCH) from the UE, wherein the PUCCH includes a clear channel indicator (CCI) and a scheduling request (SR) and the PUCCH identifies a selected channel for uplink data, wherein the CCI identifies the selected unlicensed band and an available time for an uplink data communication.

14. The arrangement of claim 13, wherein the control circuitry is configured to receive a physical uplink shared channel (PUSCH) according to the CCI and the SR.

15. The arrangement of claim 13, wherein the control circuitry is configured to hold the unlicensed band for a duration using one or more digital reference signals (DRS).

16. The arrangement of claim 13, wherein the control circuitry is configured to hold the unlicensed band for a duration by using a Wi-Fi self-CTS packet.

17. The arrangement of claim 13, wherein the UE is configured to select a channel for the uplink data and generate the CCI according to the selected channel.

18. One or more computer-readable non-transitory media having instructions that, when executed, cause one or more user equipment (UEs) to:
   select a channel for uplink data during at least a portion of a data transmission;

generate a clear channel indicator (CCI) according to the selected channel for the uplink data;

multiplex an acknowledgement (ACK)/ negative acknowledgement (NACK) with the CCI and a scheduling request (SR);

code and modulate a physical uplink control channel (PUCCH) using the multiplexed ACK/NACK; and transmit the PUCCH having the CCI with the data transmission.

19. The computer-readable media of claim 18, comprising one or more computer-readable media having instructions that, when executed, further cause the one or more user equipment (UEs) to:

transmit the uplink data according to the CCI and the SR.

20. The computer-readable media of claim 18, wherein the PUCCH is coded and modulated using the PUCCH format 1 for ACK/NACK transmissions.

21. The computer-readable media of claim 18, wherein the CCI and the SR indicate a start time for the uplink data.

* * * * *